Jan. 9, 1923.                                                                    1,441,486
A. DENMAN-JONES.
MOTOR CAR HEATING.
FILED SEPT. 28, 1920.
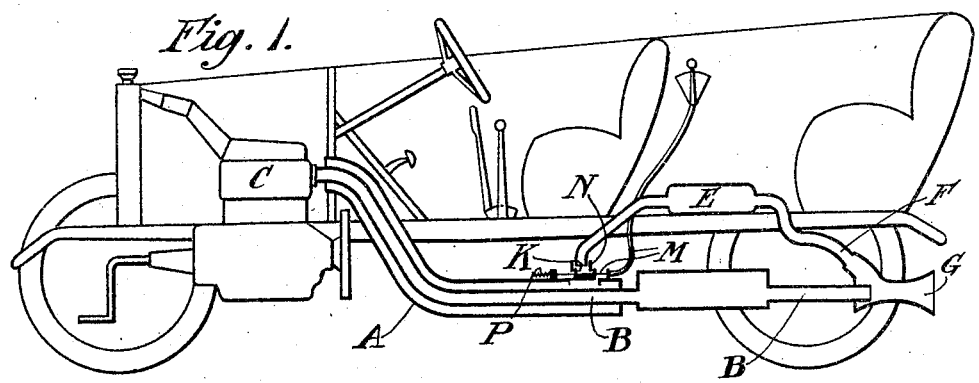
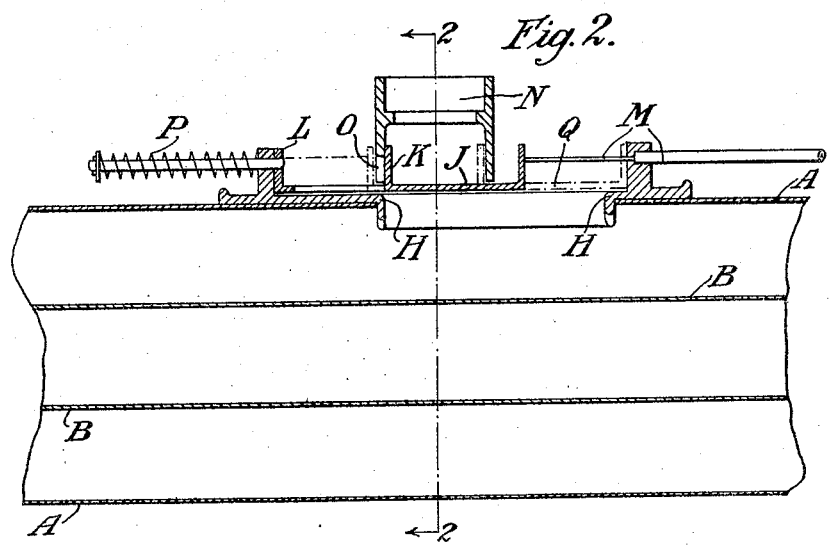
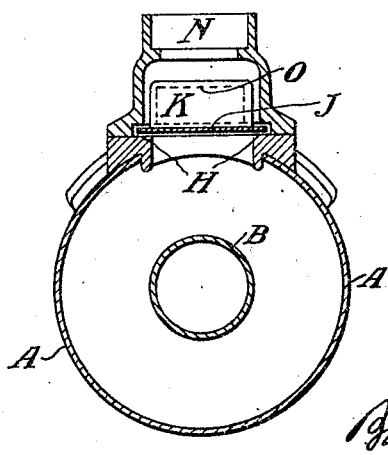
Inventor:
A. Denman-Jones
By his Attorneys,
Baldwin & Wight Patented Jan. 9, 1923.

1,441,486

UNITED STATES PATENT OFFICE.

ADRIAN DENMAN-JONES, OF HOLLOWAY, LONDON, ENGLAND.

MOTOR-CAR HEATING.

Application filed September 28, 1920. Serial No. 413,339.

*To all whom it may concern:*

Be it known that I, ADRIAN DENMAN-JONES, a subject of the King of Great Britain, residing at 37 Hartham Road, Holloway, in the county of London, England, have invented new and useful Improvements in Motor-Car Heating, of which the following is a specification.

My invention relates to heating systems using hot air derived primarily from the engine, the hot air being circulated in warming apparatus within the body of the car by any suitable means.

For brevity I designate such portion of the apparatus as warms or collects the heated air the "collector," and the actual warming apparatus for the passengers within the car body the "warmer."

With warming apparatus consisting fundamentally of tubes or channels through which hot air circulates, I have found that to obtain a uniform heat throughout the warmer, it is essential that a comparatively rapid flow of air should be maintained.

In order to regulate the degree of heat in the warmer it has been usual to insert an ordinary valve or stop cock to reduce the flow of air through the warmer, but I have found that simple throttling of the incoming hot air has material disadvantages. The effect is generally to reduce the velocity of the hot air flowing through the heating apparatus. The effect of this reduction of velocity is two-fold. Firstly, the air will move more slowly through the collector with the result that it will be raised to a higher temperature; (this is particularly evident when the hot air is collected from a hot surface, such as the exhaust pipe). Secondly, the reduction in the rate of flow will produce unequal heat in the warmer, and in actual practice closing of a throttle valve may result in the inlet end of the warmer attaining a higher temperature than when the valve is fully open, although the outlet end may be colder.

According to my invention I provide a regulating valve such that, simultaneously with the throttling of the hot air flowing into the warmer, unheated air is allowed to enter, thus equalizing, but at the same time reducing, the temperature of the warmer. It is also advantageous by opening a by-pass to allow the surplus hot air to flow from the collector into the atmosphere, thus providing against any excessive rise in temperature of the collector.

My invention is illustrated in the accompanying drawings in which:—

Figure 1 is a side elevation of an automobile fitted with a collector, a warmer and a regulating valve.

Figure 2 is a sectional view of the valve, and

Figure 3 is a section on the line 2—2, Figure 2.

A is a collector which comprises a pipe surrounding the exhaust pipe B and leading from the engine C through a regulating valve to a warmer E in the body of the car from which the hot air is ejected through a pipe F by an exhauster G into which the end of the exhaust pipe B leads.

The regulating valve is constructed as follows:—

H is a valve seating mounted on the collector A. On this seating works a slide valve J having parts K and L at right angles to the main face of the valve and operated by a wire M. N is a connection to the car warmer having a cold air inlet O which when the valve J is shut is closed by the part K and when the valve is fully open is closed by the part L. The valve is normally kept closed by the action of the spring P.

In the position shown the connection N to the car heater is closed and the hot air from the collector escapes through a port or vent Q to the atmosphere.

As the valve is opened by being moved to the right the inlet O is uncovered, the connection N gradually opened and the vent Q closed, but when the valve is fully opened the inlet O is again covered by the part L. Thus the area of the opening into N and of the port Q which is available for the outlet of the hot air from the collector is substantially constant and when the passage of the hot air to the warmer is throttled cold air can enter the warmer with the hot air.

What I claim is:—

1. The combination with the body of an automobile and the propelling engine thereof, of a warmer within the body, a pipe for carrying away the exhaust gases from the engine, a pipe heated by the exhaust gases for conducting heated air from the engine compartment or casing to the warmer, and means associated with said last mentioned pipe for simultaneously reducing the supply of heated air and admitting cool air to the warmer.

2. The combination with the body of an automobile, of a warmer within the body, a source of heated air carried by the automobile, means for conducting heated air from said source to the warmer, said conducting means having an opening therein for admitting cool air to the warming system, a valve controlling the passage of warm air to the warmer and the entrance of cool air to said conducting means, and means for operating the valve to close said opening and fully open the supply of warm air to said warmer.

3. The combination with the body of an automobile and the propelling engine thereof, of a pipe for carrying away the exhaust gases from the engine, an air warming pipe surrounding the exhaust pipe, a warmer within the body, means for reducing the pressure within the warmer beneath that of the atmosphere, a pipe opening out of the warming pipe and leading to the warmer and having in it an orifice through which cold air can enter and a valve controlling the passage of warm air from the warming pipe to this last mentioned pipe and also the entrance of cold air into this last mentioned pipe.

In testimony that I claim the foregoing as my invention I have signed my name this 14th day of September, 1920.

ADRIAN DENMAN-JONES.